US009123244B2

(12) United States Patent
Daman et al.

(10) Patent No.: US 9,123,244 B2
(45) Date of Patent: Sep. 1, 2015

(54) VEHICLE TRACKING OF PERSONAL DEVICES WITH RESPONSE SYSTEM

(71) Applicants: DENSO International America, Inc., Southfield, MI (US); DENSO CORPORATION, Kariya, Aichi-pref. (JP)

(72) Inventors: Laith Daman, Novi, MI (US); Kyle Nicholas Golsch, Pontiac, MI (US)

(73) Assignees: DENSO International America, Inc., Southfield, MI (US); DENSO CORPORATION, Kariya, Aichi-pref.

( * ) Notice: Subject to any disclaimer, the term of this patent is extended or adjusted under 35 U.S.C. 154(b) by 245 days.

(21) Appl. No.: 13/832,321

(22) Filed: Mar. 15, 2013

(65) Prior Publication Data
US 2014/0277935 A1 Sep. 18, 2014

(51) Int. Cl.
| | |
|---|---|
| *G08G 1/127* | (2006.01) |
| *B60R 1/00* | (2006.01) |
| *B60N 2/00* | (2006.01) |
| *G08B 21/22* | (2006.01) |
| *B60N 2/28* | (2006.01) |
| *G08B 21/02* | (2006.01) |
| *G08B 21/24* | (2006.01) |

(52) U.S. Cl.
CPC ............. *G08G 1/127* (2013.01); *B60N 2/002* (2013.01); *B60N 2/28* (2013.01); *B60R 1/00* (2013.01); *G08B 21/22* (2013.01); *G08B 21/0247* (2013.01); *G08B 21/24* (2013.01)

(58) Field of Classification Search
USPC ............. 701/1, 36, 49, 29.1, 29.2, 29.6, 32.3, 701/32.7, 33.2, 33.3, 33.7, 33.8, 33.9, 34.2, 701/400, 408, 409, 418, 419, 466, 515, 516, 701/517, 519, 520, 522, 523; 340/901, 988, 340/989, 995.25, 995.27, 995.28, 425.5, 340/426.18, 426.26, 426.27, 426.28, 438, 340/449, 457; 307/9.1, 10.1, 326, 328; 180/271
See application file for complete search history.

(56) References Cited

U.S. PATENT DOCUMENTS

| | | | | |
|---|---|---|---|---|
| 5,808,372 | A * | 9/1998 | Schwegler et al. | 340/5.64 |
| 5,896,554 | A * | 4/1999 | Itoh | 455/2.01 |
| 6,472,986 | B1 | 10/2002 | Sorriaux | |
| 7,009,512 | B2 | 3/2006 | Cordoba | |

(Continued)

FOREIGN PATENT DOCUMENTS

| | | |
|---|---|---|
| CN | 101770683 | 7/2010 |
| DE | 10 2009 050756 | 10/2009 |

(Continued)

OTHER PUBLICATIONS

International Serach Report and Written Opinion issued Jul. 1, 2014 in corresponding PCT Application No. PCT/JP2014/001121.

*Primary Examiner* — Thomas Tarcza
*Assistant Examiner* — Edward Pipala
(74) *Attorney, Agent, or Firm* — Harness, Dickey & Pierce, P.L.C.

(57) ABSTRACT

A method for tracking an object through a system onboard a motor vehicle is provided. The method includes detecting a wireless device, determining a position of the wireless device, recognizing the position of the wireless device relative to the vehicle, analyzing the position of the wireless device with respect to a predefined conditional statement and activating an alert according to the satisfying of the predefined conditional statement.

20 Claims, 12 Drawing Sheets

(56) References Cited

U.S. PATENT DOCUMENTS

| | | |
|---|---|---|
| 7,079,015 B2 * | 7/2006 | Gibeau .................. 340/425.5 |
| 7,183,933 B2 | 2/2007 | Dzurko et al. |
| 2006/0103516 A1 | 5/2006 | Zang |
| 2007/0035397 A1 | 2/2007 | Patenaude et al. |
| 2008/0088462 A1 | 4/2008 | Breed |
| 2008/0129475 A1 | 6/2008 | Breed et al. |
| 2011/0030639 A1 | 2/2011 | Kwiecinski et al. |
| 2011/0084807 A1 | 4/2011 | Logan et al. |
| 2012/0032796 A1 | 2/2012 | Jarrett et al. |
| 2012/0310547 A1 | 12/2012 | Cristoforo |
| 2013/0049955 A1 | 2/2013 | Hoover et al. |

FOREIGN PATENT DOCUMENTS

| | | |
|---|---|---|
| DE | 10 2011 018898 | 10/2011 |
| WO | WO2006/087888 | 8/2006 |
| WO | WO 2010/119297 | 10/2010 |

\* cited by examiner

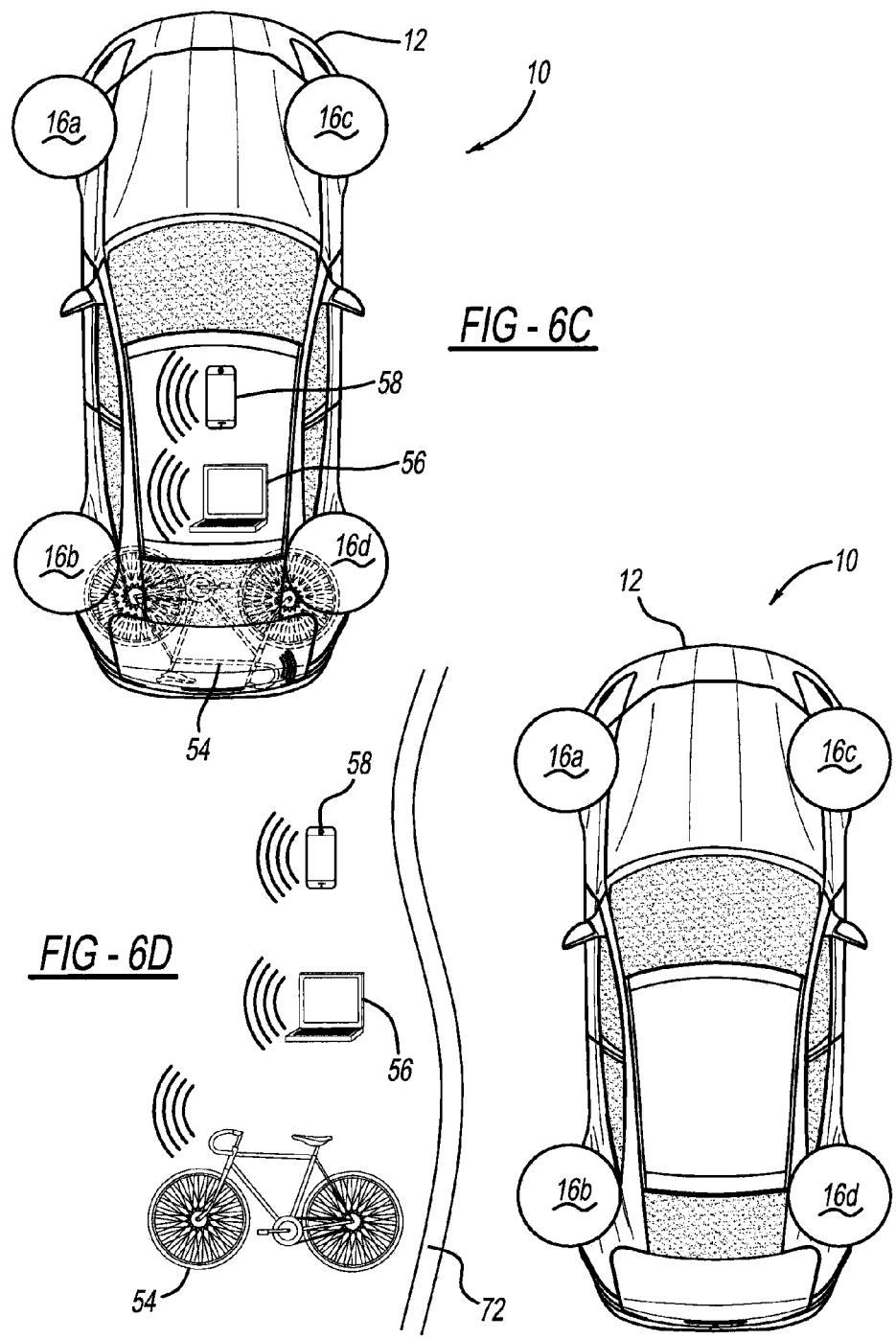

VEHICLE TRACKING OF PERSONAL DEVICES WITH RESPONSE SYSTEM

FIELD

The present disclosure relates to an alert system in which the alert system observes the position of an object with respect to a vehicle, monitors the environment with respect to the object and triggers an alert regarding the status of the object according to a predefined conditional statement.

BACKGROUND

The statements in this section merely provide background information related to the present disclosure and may not constitute prior art. It is generally known that personal articles such as bicycles, laptop computers and portable electronic devices are popular targets for thieves. Such personal articles are often stolen out of a vehicle if stored in plain-sight within the vehicle. In addition, once stolen from the vehicle, a vehicle owner may be entirely unaware that a crime has occurred. Only upon returning to the vehicle would the vehicle owner learn that any personal articles were stolen.

Further, it is generally known that dozens of children and hundreds of pets die every year as a result of being unintentionally left behind or "forgotten" inside of a vehicle. When trapped inside of the vehicle, exposure to excessive heat may cause a child or a pet to develop heat exhaustion and/or heat stroke. Even during relatively mild weather, the vehicle interior cabin may warm and quickly reach life-threatening temperatures. In cold weather, low interior cabin temperatures may cause frostbite and/or hypothermia.

Even further, it is generally known that carbon monoxide ("CO") poisoning may unsuspectingly cause loss of consciousness and/or death. CO poisoning is responsible for hundreds of deaths and thousands of emergency room visits every year. Operating a vehicle in an enclosed garage or with an obstructed exhaust system is a common cause of CO poisoning. Children are particularly susceptible to the effects of CO exposure. If trapped inside of a running vehicle within an enclosed garage, the life of a child may be endangered.

A need, therefore, exists for an alert system in which the alert system observes the position of an object, monitors the environment with respect to the object and alerts a vehicle owner regarding the status of the object according to a predefined set of conditions. More specifically, a need exists for an alert system to detect the presence of a personal article within a vehicle, to monitor the position of the personal article and to trigger an alert if the personal article is removed from the vehicle. Additionally, a need exists for an alert system to detect the presence of a child or a pet inside of a vehicle, to monitor the conditions inside and/or surrounding the vehicle and to trigger an alert if conditions within the vehicle may endanger the child or the pet.

SUMMARY

This section provides a general summary of the disclosure, and is not a comprehensive disclosure of its full scope or all of its features.

The present teachings provide for a method for tracking an object through a system onboard a motor vehicle. The method includes detecting a wireless device, determining a position of the wireless device, recognizing the position of the wireless device relative to the vehicle, analyzing the position of the wireless device with respect to a predefined condition and activating a response according to the satisfying of the predefined conditional statement.

The present teachings provide for an additional method for tracking an object through a system onboard a motor vehicle. The method includes detecting a wireless device, determining a position of the wireless device, recognizing the position of the wireless device relative to the vehicle, collecting information regarding a state of the vehicle, collecting information regarding an area surrounding the vehicle, analyzing the position of the wireless device, the information regarding the state of the vehicle and the information regarding the area surrounding the vehicle with respect to a predefined conditional statement and activating a response according to the satisfying of the predefined conditional statement.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 6C is a top view of the vehicle referenced in FIG. 6A depicting the tracked objects within the interior of the vehicle;

FIG. 6D is a top view of the vehicle referenced in FIG. 6A depicting the tracked objects removed from the interior of the vehicle;

DETAILED DESCRIPTION

Figure 1:
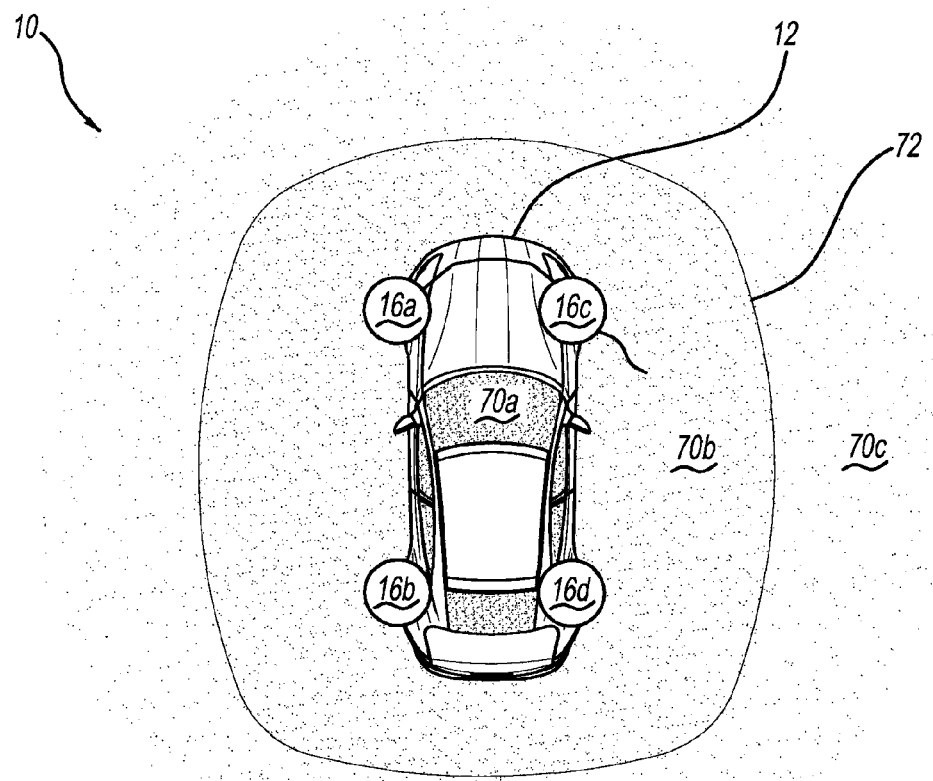
FIG. 1 is a top view of a vehicle equipped with the alert system.

The following description is merely exemplary in nature and is not intended to limit the present disclosure, application, or uses. It should be understood that throughout the drawings, corresponding reference numerals indicate like or corresponding parts and features. Turning to the present teachings, wireless communication allows for the exchange of information between electronic devices. In recent years, advances in wireless technology have improved the signal strength, latency rates, power consumption and form factor of wireless devices. For example, Classic Bluetooth ("BT") and Bluetooth Low Energy ("BLE") create small-area networks which allow short range communication between similarly equipped BT or BLE devices at a distance of up to 50 meters or 160 feet. Despite the long communication range, a single button cell battery may power a BLE device for up to one year. As a result, wireless technologies such as BT and BLE have been integrated in an ever-increasing broad range of applications and consumer products such as cellphones, Wi-Fi, medical devices, home security systems, garage door openers, personal computer accessories, Sudden Infant Death Syndrome ("SIDS") monitors, child car seats, pet collars and bicycle accessories.

The use and integration of wireless technology within the architecture of a motor vehicle has also increased. Currently, many vehicles utilize BT to synchronize devices such as a cellphone with the vehicle. Cellphone synchronization may allow a driver to place and answer phone calls through the use of voice commands and/or the vehicle controls. The driver may also control, access and manipulate applications stored within the cellphone. As a result, BT has allowed the driver to operate the cellphone while driving the vehicle. Other vehicle systems utilizing wireless technology, BT or BLE include remote keyless-entry and ignition systems, Global Positioning System ("GPS") navigation, tire pressure monitoring systems and vehicle security systems.

Wireless technology may also be used to the track the position and movements of a person or an object. Triangulation of a wireless signal to determine the position of the wireless device is well known in the art. Therefore, if the wireless device is carried by the person or attached to the object, the position of the person or the object may also be determined. For example, a cellphone or a vehicle key-fob may be used to track the position of a driver or a vehicle owner. The position of a child may be tracked by a wireless SIDS monitor attached to the child or mounted to a child car seat. A pet may be tracked by a wireless collar. A wireless speed sensor or GPS device on a bicycle may be used to determine the position of a bicycle. A wireless tracking transponder tag may be attached to virtually any object in order to track the whereabouts of that object.

Similar to vehicle-cellphone synchronization, the increasing use of wireless technology in both consumer products and vehicle architecture provides an opportunity for a vehicle to observe the position of an object, to monitor the environment with respect to the object and to trigger an alert regarding the status of the object according to a predefined set of conditional statements. Turning to the present invention, with initial reference to FIG. 1, an alert system 10 is depicted, which may be resident in a vehicle 12. The alert system 10 may include an Electronic Control Unit ("ECU") (not shown) and sensors 16a-16d. The ECU may control and process the information provided by the sensors 16a-16d. The ECU may include a wireless transceiver and a microprocessor.

The sensors 16a-16d may detect the presence of a wireless device both inside and outside of the vehicle. As shown in FIG. 1, the sensors 16a-16d may be positioned around the vehicle to provide complete wireless device detection coverage inside of the vehicle and around the entire perimeter of the vehicle. It should be understood that the invention is not limited to a specific number, location and/or direction of the sensors.

The sensors 16a-16d may emit an electromagnetic field to detect the presence of one or more wireless devices. The alert system 10 collects and monitors the information provided by the sensors 16a-16d. When a wireless device is detected, the alert system 10 may designate the wireless device as a tracked object and may monitor the position of the tracked object. The alert system 10 may analyze the information from the sensors 16a-16d and determine, for example, whether the wireless device is inside of the vehicle, close to but outside of the vehicle or far from the vehicle.

The alert system 10 may determine the position of the wireless device relative to the vehicle 12 by analyzing a Received Signal Strength Indicator ("RSSI") value provided by each sensor 16a-16d. The RSSI value is a measurement of the power level or signal strength between communicating wireless devices. Generally, the RSSI value may vary relative to the distance between the wireless devices.

Figure 2:
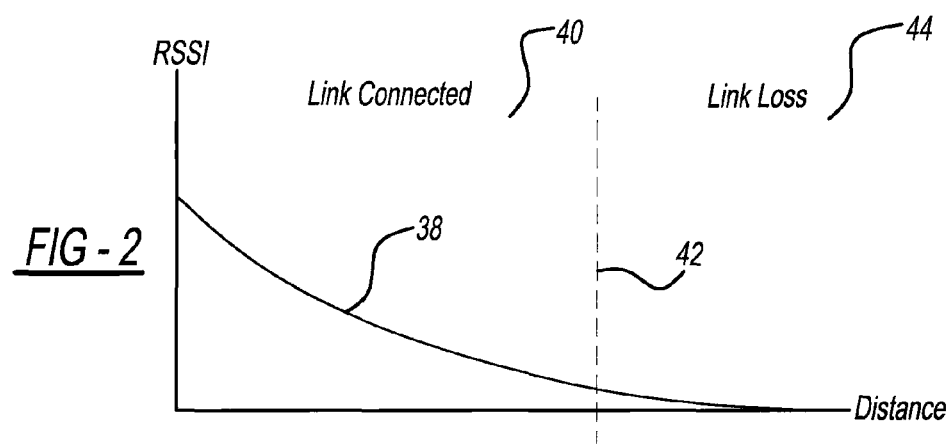
FIG. 2 is a graph illustrating the Received Signal Strength Indication value relative to the distance between two wireless devices.

FIG. 2 depicts an RSSI curve 38 to illustrate the relationship between the RSSI value and the distance between two wireless devices. The RSSI value is highest when the wireless devices are in close proximity. Inversely, the RSSI value decreases with increasing distance between the wireless devices. Despite the weakening signal strength, the wireless devices may remain in communication if the RSSI curve 38 remains within a Link Connected area 40. If the distance increases beyond a Link-Loss Threshold 42 and enters a Link-Loss area 44, the wireless signal is weak and the wireless devices are no longer in communication. However, despite the loss of communication, a measurable RSSI value may still be detected between the wireless devices. If the distance increases far beyond the Link-Loss area 44, the RSSI value diminishes and each wireless device is undetectable by the other.

The alert system 10 may determine the position of the wireless device relative to the vehicle by recording and analyzing the RSSI values between the wireless device and each sensor 16a-16d. The alert system 10 may use a mathematical derivation to calculate the position of the wireless device from the RSSI value. After the position of the wireless device is determined, the alert system 10 may assign and/or designate the wireless device to a localization state. The localization state may be an area or zone relative to the vehicle 12 within which the wireless device is likely located. Referring back to FIG. 1, the localization states may include an area or zone Inside-the-Vehicle 70a, Outside-the-Vehicle 70b and Out-of-Range/Link-Loss 70c. In addition, the localization states Outside-the-Vehicle 70b and Out-of-Range/Link-Loss 70c may be separated by a Low RSSI/Link-Loss Threshold 72.

Figure 3A:
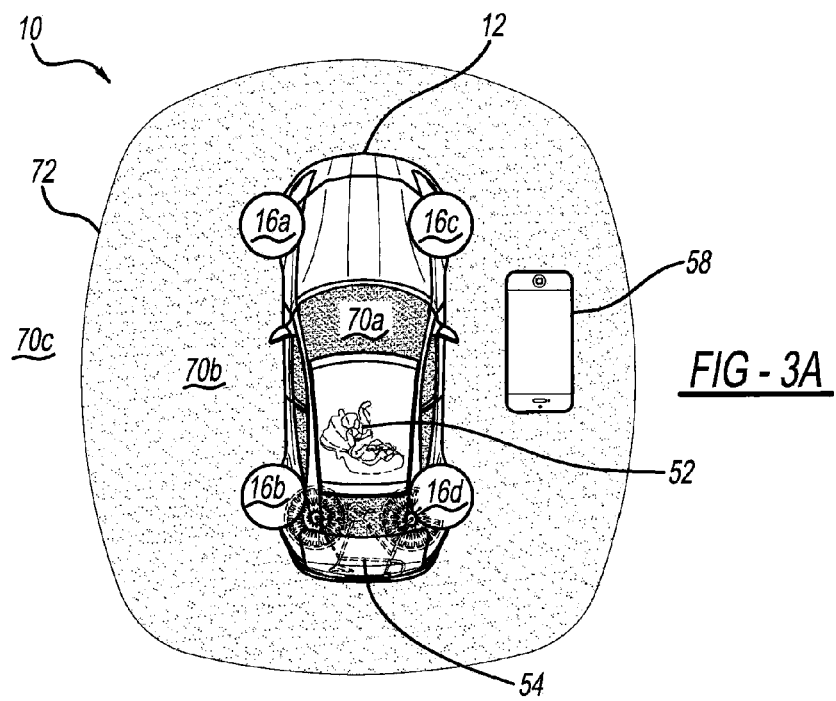
FIG. 3A is a top view of a vehicle equipped with the alert system depicting the alert system detecting the positions of a driver, a child and a bicycle.
Figure 3B:
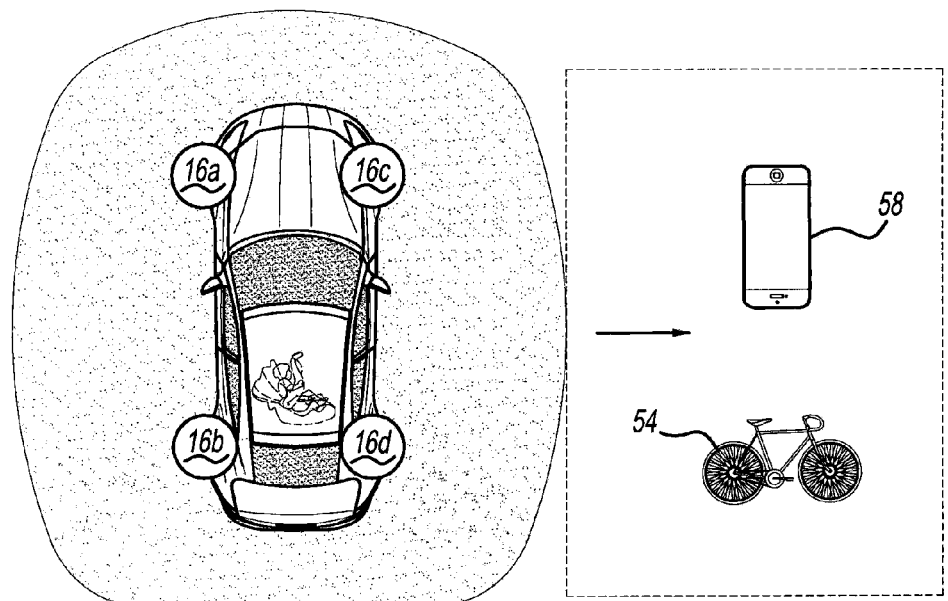
FIG. 3B is a top view of the vehicle referenced in FIG. 3A illustrating the alert system detecting a change in the positions of the driver and the bicycle.

FIGS. 3A and 3B depict the tracking of a child 52, a bicycle 54 and a cellphone 58. In FIG. 3A, the child 52 and the bicycle 54 are positioned inside of the vehicle 12. Therefore, the child 52 and the bicycle 54 may be assigned a localization state of Inside-the-Vehicle 70*a*. Similarly, the cellphone 58 is positioned outside of the vehicle 12 but not beyond the Low RSSI/Link-Loss Threshold 72. Therefore, the cellphone 58 may be assigned a localization state of Outside-the-Vehicle 70*b*.

Referring to FIG. 3B, the bicycle 54 and the cellphone 58 have moved from positions inside of the vehicle 12 to outside of the vehicle 12. Accordingly, the alert system 10 may recognize the change in position of the bicycle 54 and the cellphone 58 relative to the vehicle 12 and reassign new localization states to the bicycle 54 and the cellphone 58. Table 1 reflects the change in localization states of the child 52, the bicycle 54 and the cellphone 58 between FIGS. 3A and 3B.

TABLE 1

| Tracked Object | Figure Number | Localization State(s) |
| --- | --- | --- |
| Child 52 | FIG. 3A | Localized: Inside-the-Vehicle 70a |
| Child 52 | FIG. 3B | Localized: Inside-the-Vehicle 70a |
| Bicycle 54 | FIG. 3A | Localized: Inside-the-Vehicle 70a |
| Bicycle 54 | FIG. 3B | Localized: Out-of-Range/Link-Loss 70c |
| Cellphone 58 | FIG. 3A | Localized: Outside-the-Vehicle 70b |
| Cellphone 58 | FIG. 3B | Localized: Out-of-Range/Link-Loss 70c |

The alert system 10 may trigger an alert if the position of the tracked object and/or the state of the vehicle violates a localization policy. A localization policy may be a predefined rule or a conditional statement which governs the actions of the alert system 10. For example, a localization policy may require that an alert be triggered if the alert system 10 detects a child inside of the vehicle and the vehicle cabin is approaching life-threatening temperatures. If the conditional statement of the localization policy is satisfied, the alert system 10 may trigger an alert. The types of alerts may vary according to the urgency of the situation. Alerts may vary from a chirping of the vehicle horn to a phone call to 911 disclosing the GPS location of the vehicle.

Figure 4:
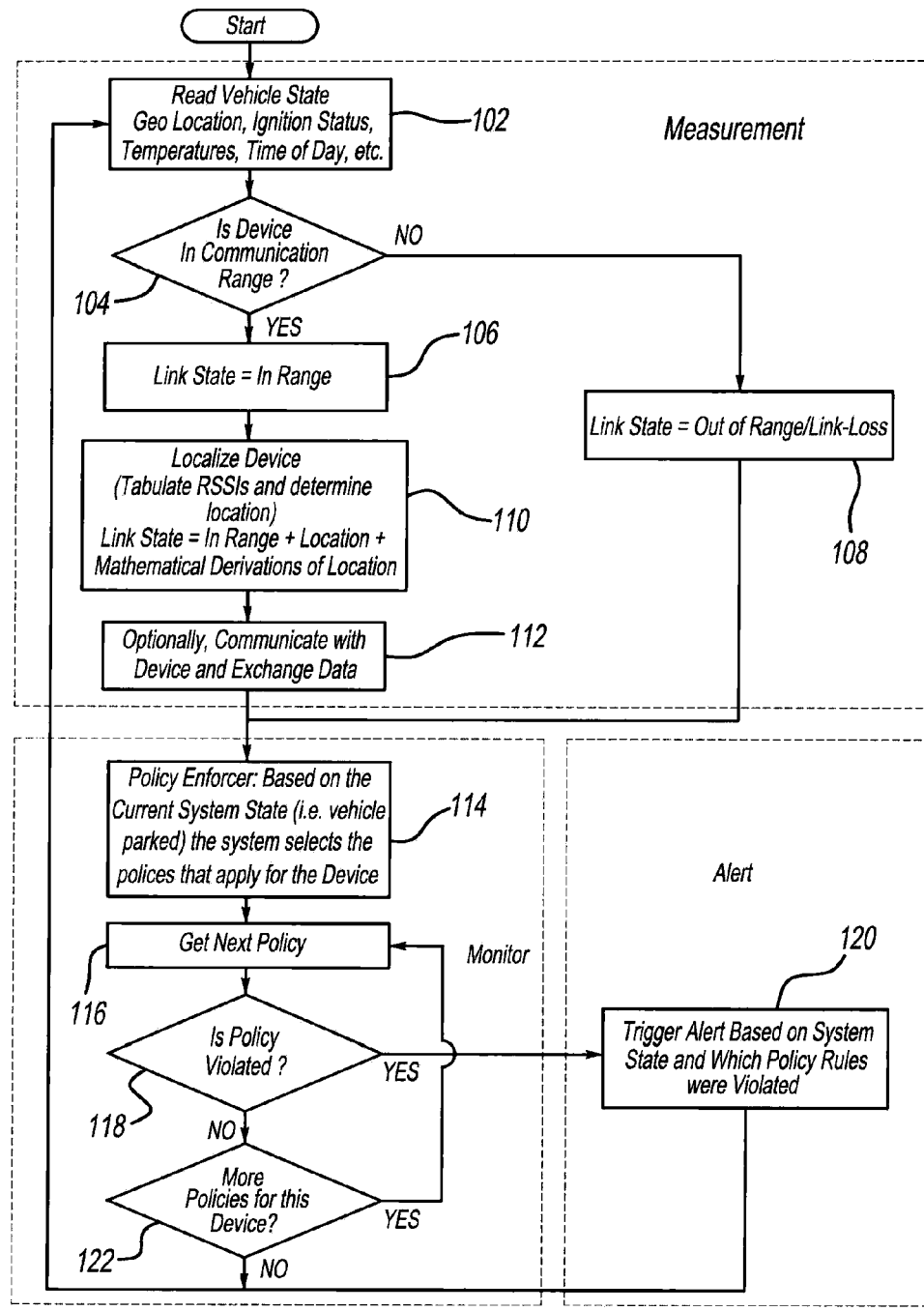
FIG. 4 is a schematic flowchart depicting the steps for observing and monitoring the position of a tracked object relative to a vehicle and determining whether to trigger an alert.

FIG. 4 is a schematic flowchart illustrating the steps for observing and monitoring the position of the tracked object and determining whether to trigger an alert. With initial reference to block 102, the alert system 10 may read and collect information regarding the vehicle state such as the GPS location, the ignition state, the exterior and interior cabin temperatures and the current date and time. The alert system 10 may utilize the vehicle architecture, subsystems and sensors to collect any available information regarding the state of the vehicle and/or the environment surrounding the vehicle. After collecting the information, the alert system 10 may determine whether the tracked object is in communication range at block 104. If the tracked object is not within communication range, corresponding to NO at block 104, the alert system 10 may be unable to determine the position of the tracked object. The tracked object may be assigned an Out-of-Range/Link-Loss localization state at block 108. If the tracked object is in range, corresponding to YES at block 104, the alert system 10 may designate an In-Range link state at block 106. The process continues at block 110 where the alert system 10 may assign a localization state to the tracked object.

At block 112, the alert system 10 may communicate and exchange data with the tracked object. Whether the alert system 10 may communicate with the tracked object may depend upon the type of wireless device of the tracked object. A tracked object such as a wireless SIDS monitor or a bicycle speed sensor may not possess the functionality to interact with the alert system 10. However, a tracked object such as a cellphone, a key-fob or a smart-device may possess the functionality to interact and synchronize with the system 10. Synchronization between the alert system 10 and the tracked object may allow the tracked object to raise alerts when encountering abnormalities in the alert system. Further, the tracked object may participate in determining whether to trigger an alert.

Continuing on at block 114, the alert system 10 may include a policy enforcer for determining whether to trigger an alert. The policy enforcer contains a list of tracked objects, the localization state of each tracked object, the vehicle state, the current system state and one or more localization policies. The policy enforcer must select the appropriate localization policy as indicated at block 116 with respect to the vehicle state and the localization state of the tracked object. After the appropriate localization policy is selected, the policy enforcer applies the localization policy at block 118.

If the tracked object violates the localization policy, corresponding to YES at block 118, the alert system 10 may trigger an alert at block 120 based upon the localization policy which was violated. If the tracked object does not violate the localization policy, corresponding to NO at block 118, the alert system 10 may check whether an additional localization policy may be enforced at block 122. If an additional localization policy may be enforced, corresponding to YES at block 122, the alert system 10 may load a new localization policy at block 116 and repeat the analysis using the new localization policy. If no additional localization policies exist, corresponding to NO at block 122, the full analysis may be repeated at block 102.

It will be understood to one of ordinary skill in the art that the alert system 10 is not limited to RSSI-based distance measurement and localization schemes. Any suitable measurement technique may be used to determine the position of the wireless device relative to the vehicle 12. For example, other distance-based schemes such as Time of Arrival ("TOA") or Time Difference of Arrival ("TDOA") may be used to calculate the distances between the wireless device and each sensor 16*a*-16*d* in order to determine the position of the wireless device. Alternatively, angle-based schemes such as Angle of Arrival ("AOA") may also be used to measure the incidence angles between the wireless device and each sensor 16*a*-16*d* such that location of the wireless device may be determined. Further, the device tracking and localization state could be determined using wireless and non-wireless technologies.

It will also be understood to one of ordinary skill in the art that the alert system 10 may be integrated with a vehicle occupant detection system. Typically, vehicle occupant detection systems may be used to detect and track the position of occupants inside of a vehicle in order to determine whether to deploy supplemental restraint systems such as airbags. Vehicle occupant detection system may employ cameras utilizing optical recognition software or seat sensors such as belt buckle sensors and/or load sensors to determine whether a vehicle seat is occupied.

The alert system 10 may use the information provided by the vehicle occupant detection system to confirm the calculated position of a tracked object. The alert system 10 may also use the information to determine the position of the tracked object when the position of the tracked object may not be calculated. For example, a driver and a child may both be positioned within a vehicle but the position of the driver cannot be determined because the driver does not have a cellphone or the cellphone is inadvertently switched off. Without a wireless signal from the cellphone, the position of the driver may not be measured by the alert system 10. However, the vehicle occupant detection system may detect that the driver seat is occupied. The alert system 10 may then use the information provided by the vehicle occupant detection system to determine the position of the driver and assign the driver a localization state. The positions of the driver and the child may continue to be tracked separately but the alert system 10 may continue to assign localization states to both the driver and the child and analyze the localization states according to the appropriate localization polices.

First Embodiment

In a first embodiment, an alert system 10 to trigger an alert when a child has been "forgotten" or left inside of a vehicle is illustrated in FIGS. 5A through 5E. The term "forgotten" may be loosely defined to include scenarios such as (a) a child intentionally left inside of the vehicle and the environment within the vehicle may endanger the health of the child or (b) a child left alone inside of the vehicle for an amount of time.

The alert system 10 may be installed on a vehicle 12. The alert system 10 may include sensors 16a-16d to observe and monitor the positions of a driver 50 and a child 52. The position of the driver 50 may be monitored by tracking the position of a cellphone 58 or any wireless device that may be used to provide authorized access to the vehicle 12 such as a key-fob or a smart-key. The position of the child 52 may be detected by tracking the wireless signal of a SIDS monitor attached to the child or a tracking transponder tag attached to a child car seat. In addition, the position of the driver 50 and position of the child 52 may also be monitored by a vehicle occupant detection system.

Figure 5A:
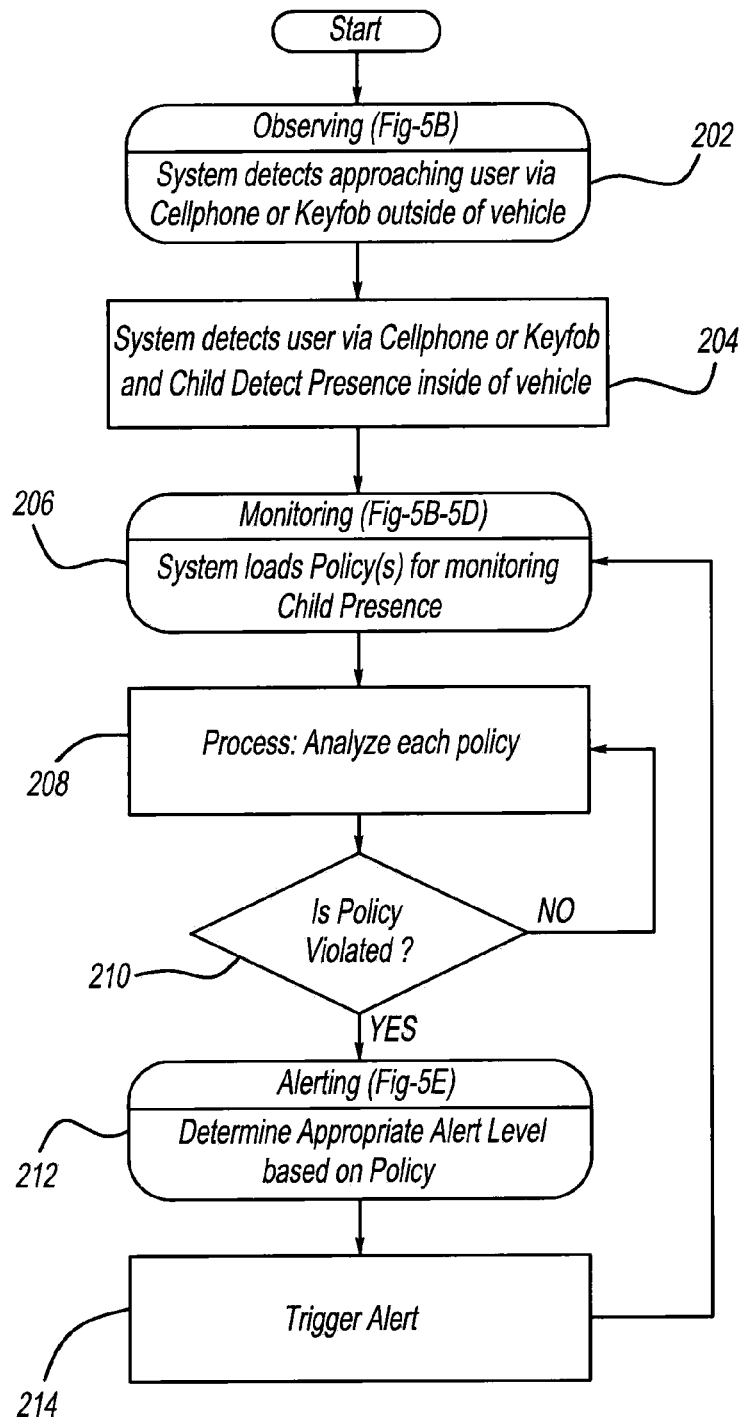
FIG. 5A is a schematic flowchart depicting the steps for observing the position of a driver and a child with respect to a vehicle, monitoring the conditions within the vehicle and determining whether to trigger an alert.

FIG. 5A is a schematic flowchart illustrating the steps for observing the presence of the driver 50 and the child 52, monitoring the positions of the driver 50 and the child 52 and determining whether to trigger an alert. At block 202, the sensors 16a-16d of alert system 10 may observe the environment surrounding the vehicle 12 to detect the presence of any wireless devices within communication range of the vehicle 12. In addition, the alert system 10 may observe and monitor the state of the vehicle 12. When one or more wireless devices are detected, the alert system 10 may identify each wireless device and may determine whether to track the wireless device. A user may instruct the system 10 to recognize specific wireless devices and designate those wireless devices for tracking. Once designated as a tracked object, the alert system 10 may observe the position of each tracked object and assign each tracked object a localization state.

Figure 5B:
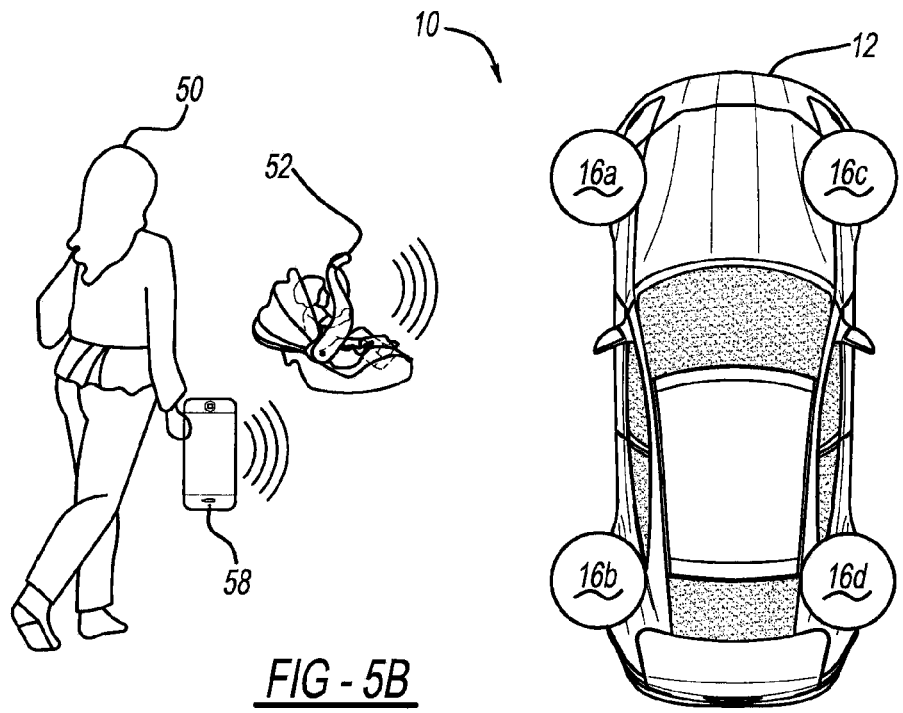
FIG. 5B is a top view of the vehicle referenced in FIG. 5A depicting the driver and the child outside of the vehicle.
Figure 5C:
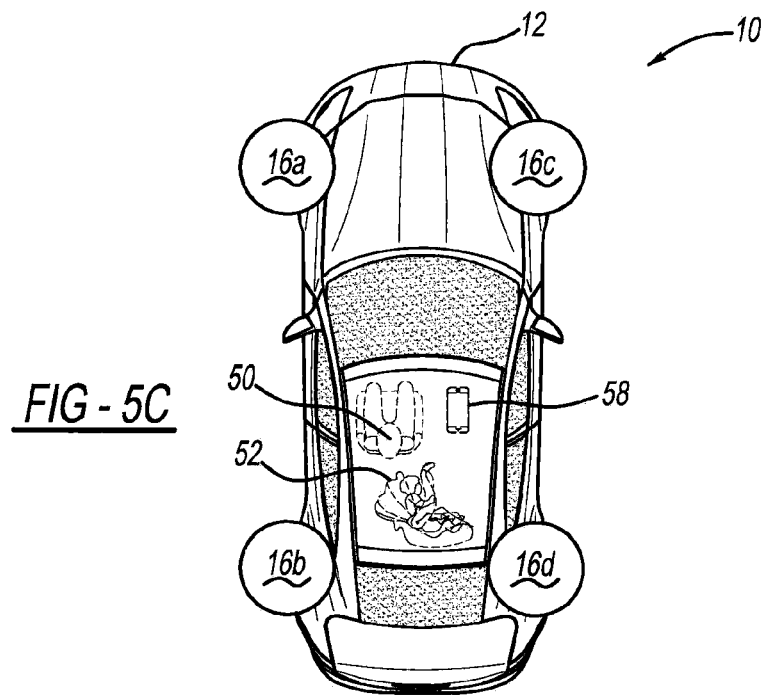
FIG. 5C is a top view of the vehicle referenced in FIG. 5A depicting the driver and the child inside of the vehicle.
Figure 5D:
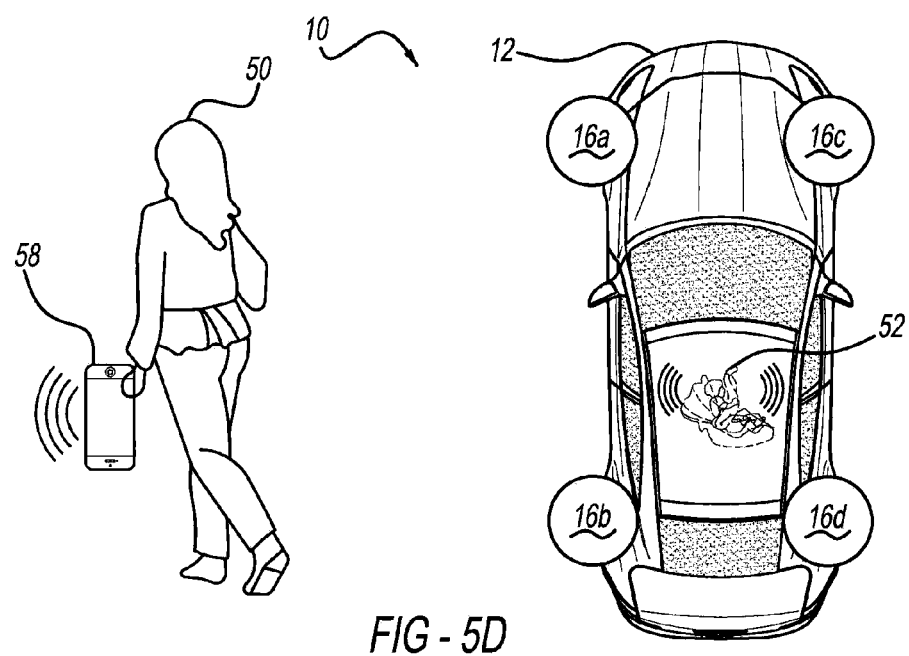
FIG. 5D is a top view of the vehicle referenced in FIG. 5A depicting the driver exiting the vehicle and the child remaining inside of the vehicle.

The alert system 10 may observe changes in the position of each tracked object relative to the vehicle 12 and may update the localization states of each tracked object. As shown in FIGS. 5B and 5C, the driver 50 and the child 52 have moved from outside of the vehicle 12 in FIG. 5B to inside of the vehicle 12 in FIG. 5C. In FIG. 5D, the driver 50 has exited the vehicle 12 while the child 52 has remained inside the vehicle 12. The alert system 10 may continually detect the new positions of the driver 50 and the child 52 as shown in block 204.

As the alert system 10 monitors the positions and localization states of the each tracked object, the alert system 10 may load the appropriate localization policies according to the observed localization state of each tracked object as shown in block 206 of FIG. 5A. Table 2 is an example localization policy table pertaining to a forgotten child inside of a vehicle. Each localization policy corresponds to a unique combination of localization states and vehicle states. The appropriate localization policies may be loaded according to the observed vehicle state and the localization states of the driver 50 and the child 52.

TABLE 2

| | | Localization State(s) | | Vehicle State(s) | | | | | |
|---|---|---|---|---|---|---|---|---|---|
| Localization Policy | Alert Level | Vehicle to Driver | Vehicle to Child | GEO Location | Ignition State/Gear | Temp | Seat Sensor(s) | Time | Triggered Alert(s) |
| 0 | OFF | Localized: Inside-the-Vehicle | Localized: Inside-the-Vehicle | Don't care | Don't care/Parked | Comfort | Driver occupied | OFF | None |
| 1 | LOW | Localized: Inside-the-Vehicle | Localized: Inside-the-Vehicle | Don't care | Don't care/Parked | Freezing/Hot | Driver occupied | >3 min | Inside vehicle: HMI warnings |
| 2 | MEDIUM | Localized: Inside-the-Vehicle | Localized: Inside-the-Vehicle | Don't care | Don't care/Parked | Freezing/Hot | Driver occupied | >5 min | Outside vehicle: Sound horn, flash exterior lights |
| 3 | HIGH | Localized: Inside-the-Vehicle | Localized: Inside-the-Vehicle | Don't care | Don't care/Parked | Freezing/Hot | Driver occupied | >10 min | Call EMS, disclose GPS location; Open windows; Turn on heat or A/C |
| 4 | LOW | Localized: Outside-the-Vehicle | Localized: Inside-the-Vehicle | Don't care | Don't care/Parked | Freezing/Hot | No seat occupied | >3 min | Outside vehicle: Sound horn, flash exterior lights |
| 5 | MEDIUM | Localized: Outside-the-Vehicle | Localized: Inside-the-Vehicle | Don't care | Don't care/Parked | Freezing/Hot | No seat occupied | >5 min | Call user cell phone, text message, etc. |
| 6 | HIGH | Localized: Outside-the-Vehicle | Localized: Inside-the-Vehicle | Don't care | Don't care/Parked | Freezing/Hot | No seat occupied | >10 min | Call EMS, disclose GPS location; Open windows; Turn on heat or A/C |
| 7 | LOW | Localized: Out-of-Range/Link-Loss | Localized: Inside-the-Vehicle | Don't care | Don't care/Parked | Freezing/Hot | No seat occupied | >3 min | Outside vehicle: Sound horn, flash exterior lights |
| 8 | MEDIUM | Localized: Out-of-Range/Link-Loss | Localized: Inside-the-Vehicle | Don't care | Don't care/Parked | Freezing/Hot | No seat occupied | >5 min | Call user cell phone, text message, etc. |

TABLE 2-continued

| Localization Policy | Alert Level | Localization State(s) | | Vehicle State(s) | | | | | |
|---|---|---|---|---|---|---|---|---|---|
| | | Vehicle to Driver | Vehicle to Child | GEO Location | Ignition State/Gear | Temp | Seat Sensor(s) | Time | Triggered Alert(s) |
| 9 | HIGH | Localized: Out-of-Range/Link-Loss | Localized: Inside-the-Vehicle | Don't care | Don't care/Parked | Freezing/Hot | No seat occupied | >10 min | Call EMS, disclose GPS location; Open windows; Turn on heat or A/C |
| 10 | LOW | Localized: Outside-the-Vehicle | Localized: Inside-the-Vehicle | Don't care | Don't care/Parked | Comfort | All seats unoccupied | >3 min | Outside vehicle: Sound horn, flash exterior lights |
| 11 | MEDIUM | Localized: Outside-the-Vehicle | Localized: Inside-the-Vehicle | Don't care | Don't care/Parked | Comfort | All seats unoccupied | >5 min | Call user cell phone, text message, etc. |
| 12 | HIGH | Localized: Outside-the-Vehicle | Localized: Inside-the-Vehicle | Don't care | Don't care/Parked | Comfort | All seats unoccupied | >10 min | Call EMS, disclose GPS location |
| 13 | LOW | Localized: Out-of-Range/Link-Loss | Localized: Inside-the-Vehicle | Don't care | Don't care/Parked | Comfort | All seats unoccupied | >3 min | Outside vehicle: Sound horn, flash exterior lights |
| 14 | MEDIUM | Localized: Out-of-Range/Link-Loss | Localized: Inside-the-Vehicle | Don't care | Don't care/Parked | Comfort | All seats unoccupied | >5 min | Call user cell phone, text message, etc. |
| 15 | HIGH | Localized: Out-of-Range/Link-Loss | Localized: Inside-the-Vehicle | Don't care | Don't care/Parked | Comfort | All seats unoccupied | >10 min | Call EMS, disclose GPS location |

As shown in block 208, the alert system 10 may analyze the vehicle state and the localization states of the tracked objects with respect to the loaded localization policy. If the loaded localization policy is not violated, corresponding to NO at block 210, the alert system 10 may load a new localization policy at block 208 and repeat the analysis using the new localization policy. However, if the loaded localization policy is violated, corresponding to YES at block 210, the alert system 10 may determine the appropriate alert level based on the localization policy which was violated. Table 2 also lists the alert level for each localization policy. Once the appropriate alert level is determined at block 212, the alert system 10 may trigger an alert as shown in block 214.

Table 2 lists the triggered alerts for each localization policy. The types of triggered alerts and the magnitude of the alerts may depend upon the urgency of the situation. For example, as shown in "Localization Policy 0" in Table 2, no alert will trigger if both the driver 50 and the child 52 are located inside of the vehicle 12 and the vehicle cabin is at a comfortable temperature. As shown in "Localization Policy 1", if both the driver 50 and the child 52 are located inside of the vehicle 12 and the vehicle cabin is at a life-threatening temperature for greater than 3 minutes, a "LOW" alert level may be designated and the alert system 10 may trigger an alert inside of the vehicle 12 through a Human Machine Interface ("HMI") warning. HMI warnings may include a visible warning light and/or a message through the vehicle instrument panel, an audible message through the sound system, a vibration of the driver seat, and/or a warning utilizing any sensory interface between the vehicle 12 and the driver 50. HMI warnings may awaken a driver 50 who has fallen asleep inside of the vehicle 12.

Figure 5E:
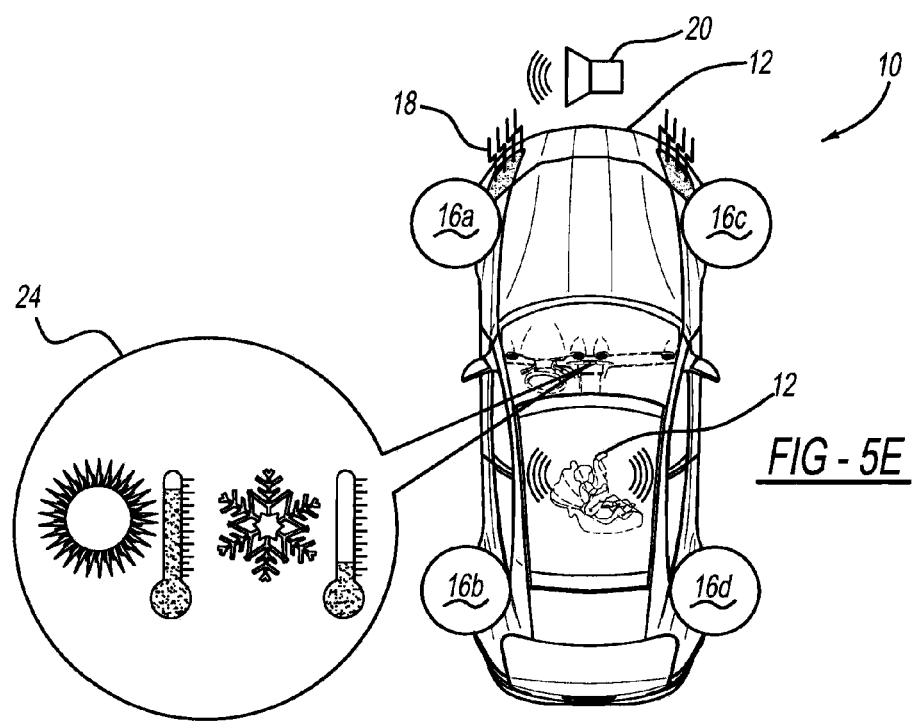
FIG. 5E is a top view of the vehicle referenced in FIG. 5A depicting the child endangered inside of the vehicle resulting in a triggered alert.

As shown in "Localization Policy 2" of Table 2 and illustrated in FIG. 5E, if the alert system 10 is not deactivated after 5 minutes, a "MEDIUM" alert level may be designated. The triggered alerts for the "MEDIUM" alert level may include exterior flashing lights 18 and a sounding of the vehicle horn 20. The flashing lights 18 and the sounding of the vehicle horn 20 may draw the attention to the vehicle 12 and increase the likelihood that a bystander may assist in waking up the driver 50. If the driver 50 is unconscious, the bystander may also attempt to remove the child 52 from the vehicle 12 and/or contact Emergency Medical Services ("EMS"). The triggered alerts for the "MEDIUM" alert level may also activate in addition to the triggered alerts for the "LOW" alert level.

As shown in "Localization Policy 3" of Table 2, if the alert system 10 is not deactivated within 10 minutes, the alert system 10 may designate a "HIGH" alert level. The triggered alert for the "HIGH" alert level may include contacting EMS and disclosing the GPS location of the vehicle 12. Contacting EMS and disclosing the GPS location of the vehicle 12 may provide immediate assistance to remove the driver 50 and the child 52 from the vehicle 12. The alert system 10 may also take corrective action to warm or cool the vehicle cabin temperature by opening the vehicle windows or utilizing the vehicle climate control system.

Second Embodiment

In a second embodiment, an alert system 10 to trigger an alert when a personal article is removed and/or stolen from inside of a vehicle 12 is illustrated in FIGS. 6A through 6E. The personal article may include a bicycle 54, a computer 56 and/or cellphone 58. The position of the bicycle 52 may be detected by tracking the position of a wireless speed sensor or GPS device. The positions of the computer 56 and cellphone 58 may be detected by tracking the BT, BLE, GPS, Wi-Fi and/or wireless communication signatures of the computer 56 and cellphone 58.

Figure 6A:
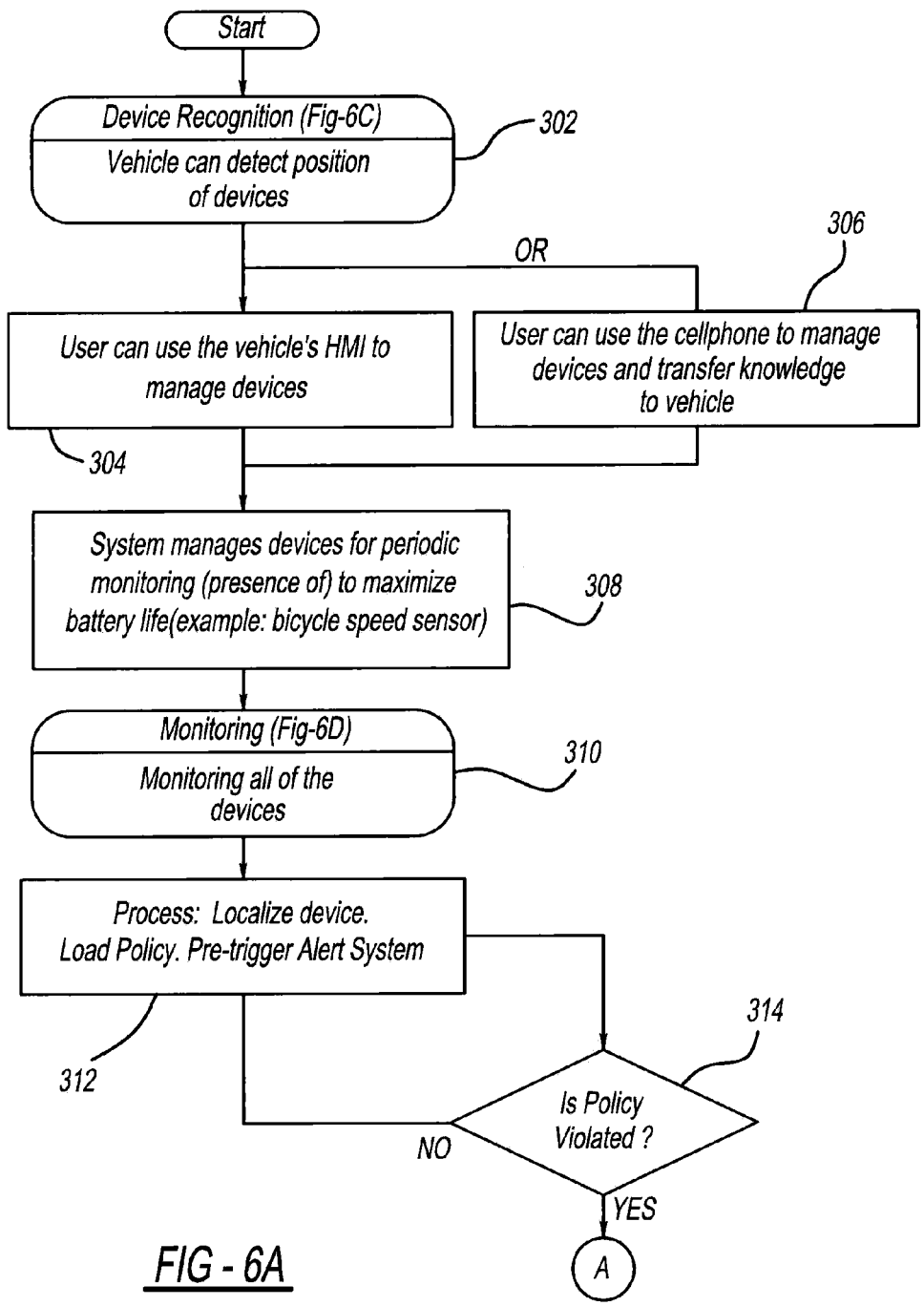
FIG. 6A is a schematic flowchart depicting the steps for detecting the existence of tracked objects inside of a vehicle, monitoring the position of the tracked objects and triggering an alert if the tracked objects are removed from the vehicle.
Figure 6B:
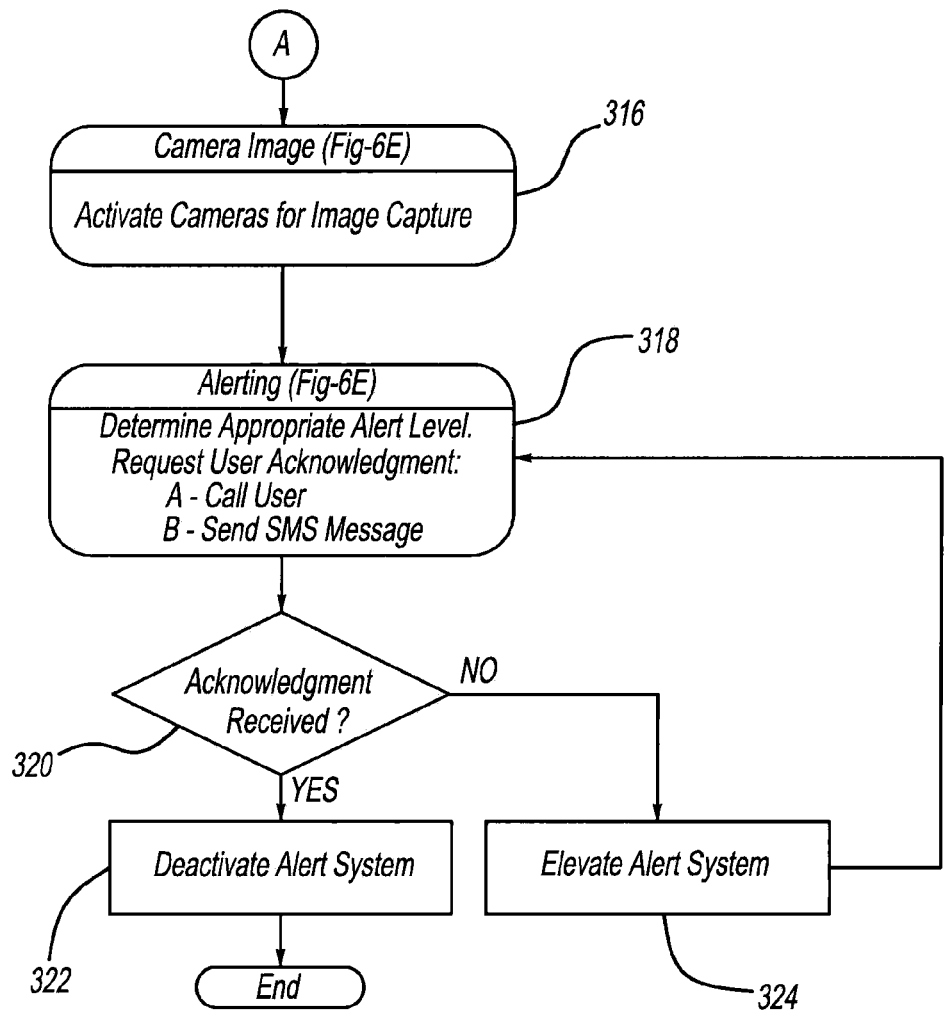
FIG. 6B is a continuation of the schematic flowchart in FIG. 6A.

FIGS. 6A and 6B are schematic flowcharts illustrating the steps for monitoring the positions of the bicycle 54, the computer 56 and/or the cellphone 58 and determining whether to trigger an alert. At block 302, the sensors 16a-16d of alert system 10 may observe the interior of the vehicle 12 to detect the presence of any wireless devices within the vehicle 12. In FIG. 6C, the alert system 10 has detected the bicycle 54, the computer 56 and the cellphone 58 inside of the vehicle 12.

A user may designate which of the detected personal articles may be tracked by the alert system 10. For example, just prior to exiting the vehicle 12, the alert system 10 may prompt the user to designate which of the bicycle 54, the computer 56 and/or the cellphone 58 should be monitored while the user is away from the vehicle. At block 304 in FIG. 6A, the user may utilize the vehicle HMI to select which personal articles to designate as tracked objects. In addition, the user may also utilize a mobile electronic device such as a cellphone or smart-device to designate which personal articles to track, as shown at block 306.

Referring to block 308, the alert system 10 may maximize the battery life of the wireless device used to signal the position of the tracked object by varying the rate of frequency with which the alert system 10 communicates with the wireless device. Periodic communication between the alert system 10 and the wireless device, as opposed to a constant stream of communication, will preserve the battery life of the wireless device. The alert system 10 may also adjust the rate of periodic communication according to the battery state of the vehicle 12 and/or wireless device. Further, the alert system 10 may vary the rate of periodic communication according to the GPS location of the vehicle. For example, the alert system 10 may increase the periodic rate of communication with wireless device if the vehicle 12 is located in a high-crime area. Additionally, the periodic rate of communication may be user-customizable.

At block 310, the alert system 10 may detect the movements of each tracked object relative to the vehicle 12. As shown in FIGS. 6C and 6D, the bicycle 54, the computer 56 and the cellphone 58 have moved from inside of the vehicle 12 in FIG. 6C to outside of the vehicle 12 in FIG. 6D. The alert system 10 may continue to detect the new positions of the bicycle 54, the computer 56 and the cellphone 58 and update each with a corresponding localization state as shown at block 312 in FIG. 6A.

Also at block 312, the alert system 10 may load localization policies according to the observed localization state of each tracked object. In addition, the alert system 10 may analyze the localization states of each tracked object according to the loaded localization policy.

The alert system 10 may also anticipate the violation of a loaded localization policy. Prior to violating the localization policy, the alert system 10 may monitor the movement of the tracked object and may pre-trigger alerts if the alert system 10 foresees the violating of the localization policy. Pre-triggering of alerts may minimize any delays in the alert system 10 when activating alerts.

Referring to block 314, if the loaded localization policy is not violated, corresponding to NO at block 314, the alert system 10 may load a new localization policy at block 312 and repeat the analysis using the new localization policy. However, if the loaded localization policy is violated, corresponding to YES at block 314, the alert system 10 may determine the appropriate alert level based on the localization policy. Table 3 is an example localization policy table pertaining to the monitoring of a laptop computer and/or a bicycle. Table 3 also lists the corresponding alert level and triggered alerts for each localization policy.

TABLE 3

| Localization Policy | Alert Level | | Vehicle State(s) | | | |
| --- | --- | --- | --- | --- | --- | --- |
| | | | Ignition State/Gear | Seat Sensor(s) | Time | Triggered Alert(s) |
| | | Localization State(s) Vehicle to Computer | | | | |
| 0 | OFF | Localized: Inside-the-Vehicle | Don't care/Parked | Seat(s) occupied | OFF | None |
| 1 | LOW | Localized: Outside Close-Range | Don't care/Parked | All seats unoccupied | >1 min | Outside vehicle; Small horn chirps. Activate camera sensors for still images. Send SMS message to driver/user |
| 2 | MEDIUM | Localized: Outside Far-Range | Don't care/Parked | All seats unoccupied | >3 min | Outside vehicle; Sound horn, flash exterior lights. Activate camera sensors for images. Phone call to driver/user |
| 3 | HIGH | Localized: Out-of-Range/Link-Loss | Don't care/Parked | All seats unoccupied | >5 min | Call 911, disclose GPS location |
| | | Localization State(s) Vehicle to Bicycle | | | | |
| 0 | OFF | Localized: Inside-the-Vehicle | Don't care/Parked | Seat(s) occupied | OFF | None |
| 1 | LOW | Localized: Outside Close-Range | Don't care/Parked | All seats unoccupied | >30 sec | Outside vehicle; Small horn chirps. Activate camera sensors for still images. Send text message to driver/user |
| 2 | MEDIUM | Localized: Outside Far-Range | Don't care/Parked | All seats unoccupied | >1 min | Outside vehicle; Sound horn, flash exterior lights. Activate camera sensors for images. Phone call to driver/user |
| 3 | HIGH | Localized: Out-of-Range/Link-Loss | Don't care/Parked | All seats unoccupied | >5 min | Call 911, disclose GPS location |

Figure 6E:
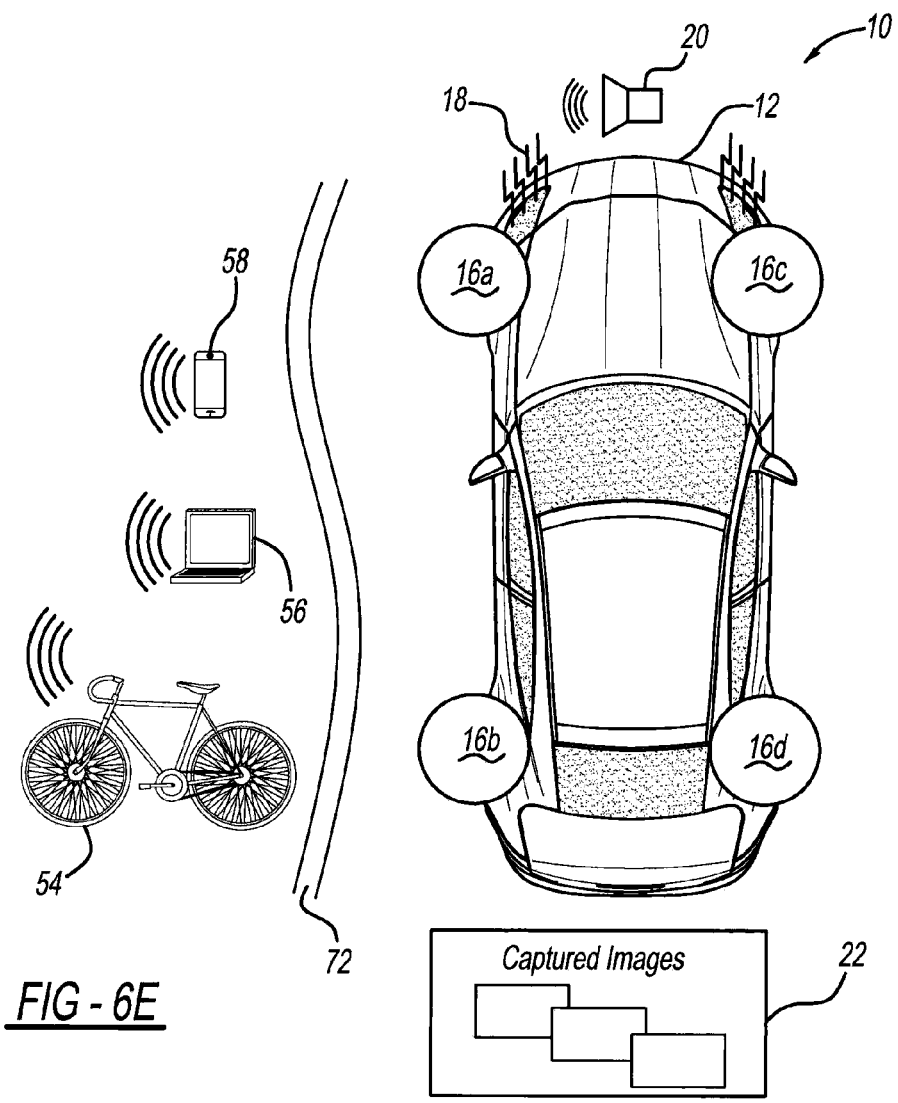
FIG. 6E is a top view of the vehicle referenced in FIG. 6A depicting the tracked objects removed from the interior of the vehicle resulting in a triggered alert.

As depicted in FIG. 6D, the bicycle 54, the computer 56 and the cellphone 58 are located outside of vehicle 12 just beyond a "Link-Loss" threshold 72. As shown in "Localization Policy 2" of Table 3, if the bicycle 54 and the computer 56 are located a far-range outside of the vehicle 12, a "MEDIUM" alert level may be designated by the alert system 10. As illustrated in FIG. 6E, the triggered alerts for the "MEDIUM" alert level may include exterior flashing lights 18, a sounding of the vehicle horn 20 and a capturing of images 22. At block 316 of FIG. 6B, the alert system 10 may activate cameras (not shown) positioned both inside and outside of the vehicle 12 to capture images 22 of the tracked object being removed from the vehicle 12. The alert system 10 may store the images 22 and/or send the images 22 to a cellphone and/or email of the user.

At block 318, the alert system 10 may contact the user via a telephone call, an SMS message and/or an email to alert the user that the tracked object is being removed from the vehicle 12. The alert system 10 may also send the images 22 to the user. In addition, the alert system 10 may request acknowledgment from the user to confirm whether the removal of the tracked object is authorized. If the user confirms that the removal of the tracked object is authorized, corresponding to YES at block 320, the alert system 10 may deactivate any triggered alerts as shown at block 322. However, if the user does not respond or acknowledge whether the removal of the tracked object is authorized, corresponding to NO at block 320, the alert system 10 may continue the alerts and elevate the alerts as shown at block 324.

Third Embodiment

Figure 7A:
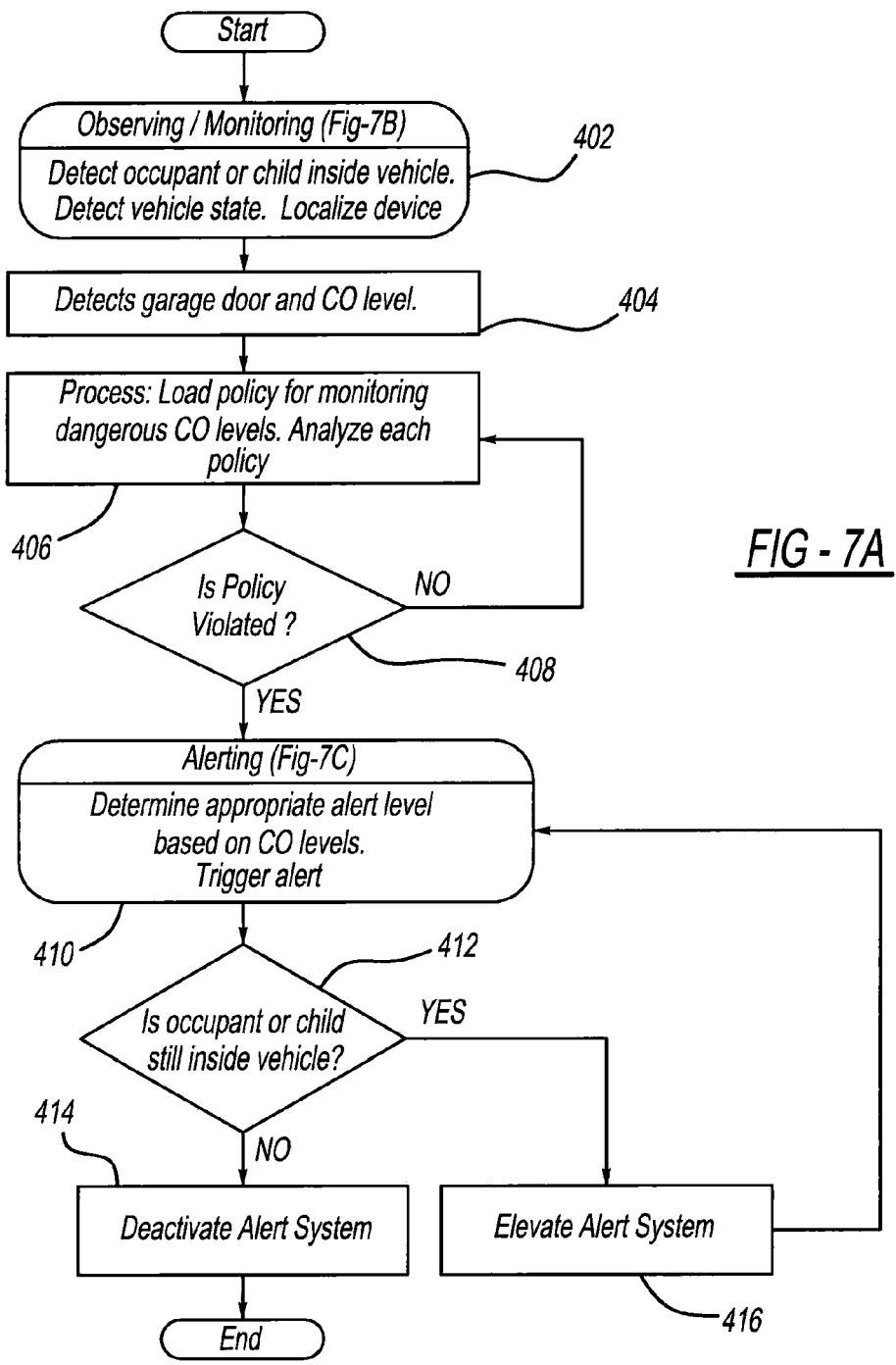
FIG. 7A is a schematic flowchart depicting the steps for detecting a child inside of a vehicle and the position of a garage door, analyzing CO levels and determining whether to trigger an alert.
Figure 7B:
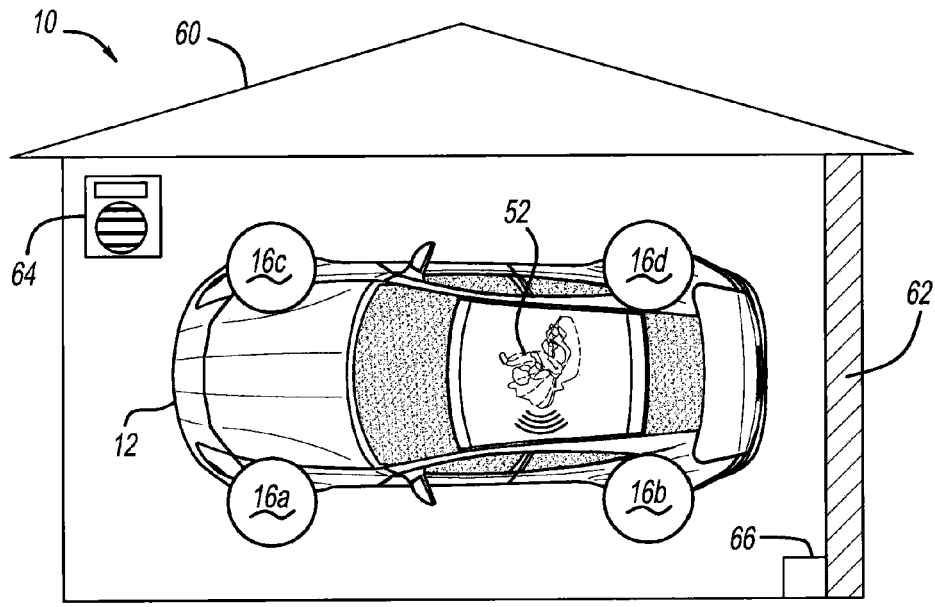
FIG. 7B is a top view of the vehicle referenced in FIG. 7A depicting the child inside of the vehicle.
Figure 7C:
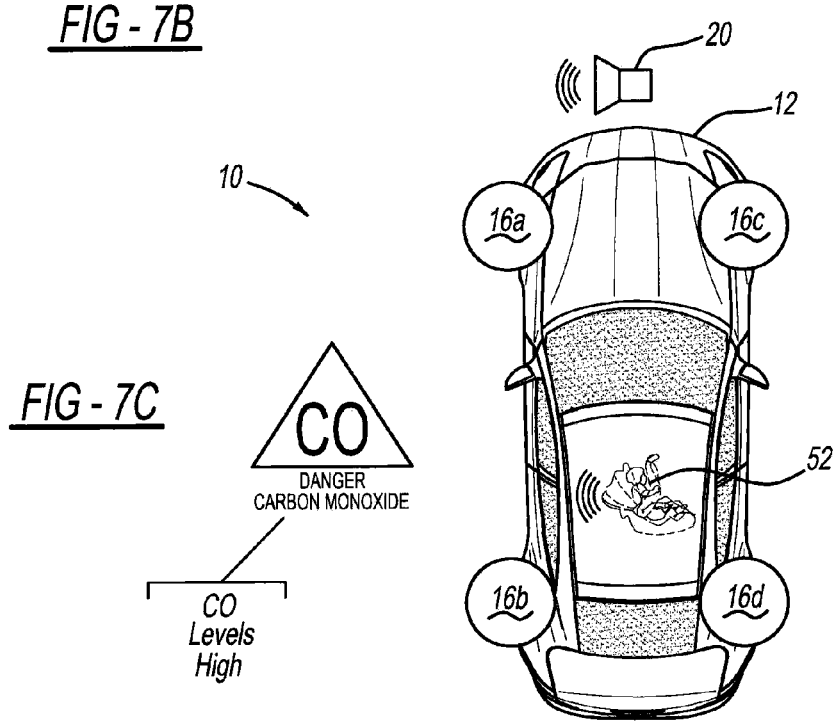
FIG. 7C is a top view of the vehicle referenced in FIG. 7A depicting the child endangered inside of the vehicle resulting in a triggered alert.

In a third embodiment, an alert system 10 to trigger an alert when CO may endanger the health of an occupant inside of a vehicle is illustrated in FIGS. 7A through 7C. The alert system 10 may wirelessly communicate with a CO sensor 64 and/or a garage door position sensor 66. The CO sensor 64 and/or the garage door position sensor 66 may be integrated with a home security system and/or a CO detection system, such as those disclosed in U.S. Pat. No. 7,183,933 and US Patent Publication No. 2011/0030639.

FIG. 7A is a schematic flowchart illustrating the steps for detecting the presence of a child or an occupant within the vehicle 12, monitoring the vehicle state, monitoring the CO level within the garage and issuing an alert if the CO level may endanger the child or the occupant. At block 402 of FIG. 7A, the sensors 16a-16d may detect the presence of a child or an occupant inside of the vehicle 12. A user may instruct the alert system 10 to distinguish between a child and an occupant by associating a child to a wireless device. The alert system 10 may recognize the wireless device as a child and load the appropriate localization policies.

FIG. 7B depicts a child inside vehicle 12. The position of the child 52 may be transmitted by a signal from a wireless SIDS monitor attached to the child or a tracking transponder tag attached to a child car seat. After detecting the presence of the child 52, the alert system 10 may assign a localization state for the position of the child 52 and continue to observe the position of the child 52 relative to the vehicle 12. At block 404, the alert system 10 may communicate with the CO sensor 64 to monitor the CO level within the garage. The alert system 10 may also communicate with the garage door position sensor 66 to determine the position of the garage door 62.

At block 406 of FIG. 7A, the alert system 10 may load the appropriate localization policies according to the localization state of the child 52, the vehicle state, the CO level detected by CO sensor 64 and the position of the garage door 62. Table 4 is an example localization policy table pertaining to the monitoring of CO levels when a child is inside of a vehicle.

TABLE 4

| Localization Policy | Alert Level | Localization State(s) Vehicle to Child | Vehicle State(s) GEO Location | Ignition State/Gear | CO Level | Seat Sensor(s) | Garage Door State | Time | Triggered Alert(s) |
|---|---|---|---|---|---|---|---|---|---|
| 0 | OFF | Localized: Inside-the-Vehicle | Don't care | Don't care/Parked | Low | Don't care | Closed | OFF | None |
| 1 | LOW | Localized: Inside-the-Vehicle | Don't care | Don't care/Parked | Medium | Any seats occupied | Closed | >1 min | Inside vehicle HMI warnings |
| 2 | MEDIUM | Localized: Inside-the-Vehicle | Don't care | Don't care/Parked | Medium | All seats unoccupied | Closed | >3 min | Outside vehicle; Sound horn, flash exterior lights; Phone call or send SMS message to driver/user |
| 3 | HIGH | Localized: Inside-the-Vehicle | Don't care | Don't care/Parked | Medium | Driver occupied | Closed | >10 min | Call EMS, disclose GPS location; Open garage door |
| 4 | LOW | Localized: Inside-the-Vehicle | Don't care | Don't care/Parked | High | Any seats occupied | Don't care | >30 sec | Inside vehicle HMI warnings |
| 5 | MEDIUM | Localized: Inside-the-Vehicle | Don't care | Don't care/Parked | High | All seats unoccupied | Don't care | >1 min | Outside vehicle; Sound horn, flash exterior lights; Phone call or send SMS message to driver/user |
| 6 | HIGH | Localized: Inside-the-Vehicle | Don't care | Don't care/Parked | High | Driver occupied | Don't care | >5 min | Call EMS, disclose GPS location; Open garage door if closed |

Also at block 406, the alert system 10 may analyze the CO level according to the loaded localization policy. As shown in Table 4, the alert system 10 may designate a "Low" CO level if the measured CO level may endanger the health of a child, a "Medium" CO level if the measured CO level may endanger a child but not an adult and a "High" CO level if the CO level exceeds the threshold for an adult. If the loaded localization policy is not violated, corresponding to NO at block 408, the alert system 10 may load a new localization policy at block 406 and repeat the analysis using the new localization policy. However, if the loaded localization policy is violated, corresponding to YES at block 408, the alert system 10 may determine the appropriate alert level based on the localization policy at block 410.

Table 4 lists the alert levels and the corresponding triggered alerts for each localization policy. Alert levels may vary according to the CO level and the amount of exposure. For example, a prolonged exposure to "Medium" CO levels may result in a "HIGH" alert level.

After triggering an alert, the alert system 10 may continue to monitor the position of the child 52. If the child 52 is no longer detected inside of the vehicle 12, corresponding to NO at block 412, the alert system 10 may be deactivated as shown at block 414. However, if the child 52 is still detected inside of the vehicle 12, corresponding to YES at block 412, the alert system 10 will continue monitoring and elevate the alerts as shown at block 416.

What is claimed is:

1. A method for tracking an object through a system onboard a motor vehicle comprising:
    detecting a first wireless device and a second wireless device, the first wireless device possessed by a user and the second wireless device coupled to the object to be tracked;
    determining positions of the first and the second wireless devices;
    recognizing the positions of the first and the second wireless devices relative to the vehicle;
    analyzing the positions of the first and the second wireless devices with respect to a predefined conditional statement; and
    activating a response according to the satisfying of the predefined conditional statement.

2. The method of claim 1, wherein satisfying the predefined conditional statement comprises determining that the position of at least one of the first and the second wireless devices are outside of the vehicle.

3. The method of claim 1, wherein the response emanates from at least one of the first and the second wireless devices or the vehicle.

4. The method of claim 1, wherein the response comprises at least one of a telephone communication to the user, an electronic communication to the user or notifying emergency service providers.

5. The method of claim 1, wherein determining the positions of the first and the second wireless devices comprises at least one of measuring distances between the first and the second wireless devices and the system or measuring angles between the first and the second wireless devices and the system.

6. The method of claim 1, further comprising:
    capturing images of the vehicle and area surrounding the vehicle;
    storing the images of the vehicle and the area surrounding the vehicle into system memory; and
    sending the images of the vehicle and the area surrounding the vehicle to the user.

7. The method of claim 1, further comprising:
    prompting the user to deactivate the response through a mobile electronic device.

8. The method of claim 1, further comprising:
    providing the user access to functionality of the system through at least one of the vehicle or a mobile electronic device.

9. The method of claim 1, wherein determining the position of the first and the second wireless devices comprises periodic communication with the first and the second wireless devices, and wherein the frequency of periodic communication with the first and the second wireless devices may vary according to at least one of a user input, a geographical location of the vehicle or battery life of the first and the second wireless devices or the vehicle.

10. The method of claim 1, wherein the system may detect a plurality of the second wireless devices and the user may select which of the plurality of the second wireless devices to track.

11. A method for tracking an object through a system onboard a motor vehicle comprising:
    detecting a wireless device coupled to the object to be tracked;
    determining a position of the wireless device;
    recognizing the position of the wireless device relative to the vehicle;
    collecting at least one of information regarding a state of the vehicle and information regarding an area surrounding the vehicle;
    analyzing the position of the wireless device and at least one of the information regarding the state of the vehicle and the information regarding the area surrounding the vehicle with respect to a predefined conditional statement; and
    activating a response according to the satisfying of the predefined conditional statement.

12. The method of claim 11, wherein collecting information regarding the state of the vehicle comprises sensing an occupant inside of the vehicle utilizing onboard vehicle systems.

13. The method of claim 11, wherein collecting information regarding the state of the vehicle comprises measuring of an interior cabin temperature of the vehicle.

14. The method of claim 13, wherein satisfying the predefined conditional statement comprises determining that the interior cabin temperature of the vehicle may harm the object.

15. The method of claim 14, wherein activating a response according to the satisfying of the predefined conditional statement comprises at least one of increasing the interior cabin temperature of the vehicle or decreasing the interior cabin temperature of the vehicle.

16. The method of claim 11, wherein collecting information regarding an area surrounding the vehicle comprises wirelessly communicating with a carbon monoxide detector.

17. The method of claim 16, wherein collecting information regarding an area surrounding the vehicle comprises detecting a level of carbon monoxide.

18. The method of claim 17, wherein satisfying the predefined conditional statement comprises determining that the level of carbon monoxide may harm the object.

19. The method of claim 18, wherein activating a response according to the satisfying of the predefined conditional statement comprises at least one of opening a garage door.

20. A method for tracking an object through a system onboard a motor vehicle comprising:
    detecting a first wireless device and a second wireless device, the first wireless device possessed by a user and the second wireless device coupled to the object to be tracked;
    determining positions of the first and the second wireless devices;
    collecting at least one of information regarding a state of the vehicle and information regarding an area surrounding the vehicle;
    recognizing the positions of the first and the second wireless devices relative to the vehicle;
    analyzing the positions of the first and the second wireless devices and at least one of the information regarding the state of the vehicle and the information regarding the area surrounding the vehicle with respect to a predefined conditional statement; and
    activating a response according to the satisfying of the predefined conditional statement.

* * * * *